No. 619,106. Patented Feb. 7, 1899.
M. A. WHEATON.
CAN HEADING MACHINE.
(Application filed July 28, 1891.)
(No Model.) 6 Sheets—Sheet 1.

Witnesses Inventor
Milton A. Wheaton
By Dewey & Co.
Attys

No. 619,106. Patented Feb. 7, 1899.
M. A. WHEATON.
CAN HEADING MACHINE.
(Application filed July 28, 1891.)
(No Model.) 6 Sheets—Sheet 2.

Witnesses,
Inventor,
Milton A. Wheaton
By Dewey & Co.
Attys

No. 619,106. Patented Feb. 7, 1899.
M. A. WHEATON.
CAN HEADING MACHINE.
(Application filed July 28, 1891.)
(No Model.) 6 Sheets—Sheet 3.
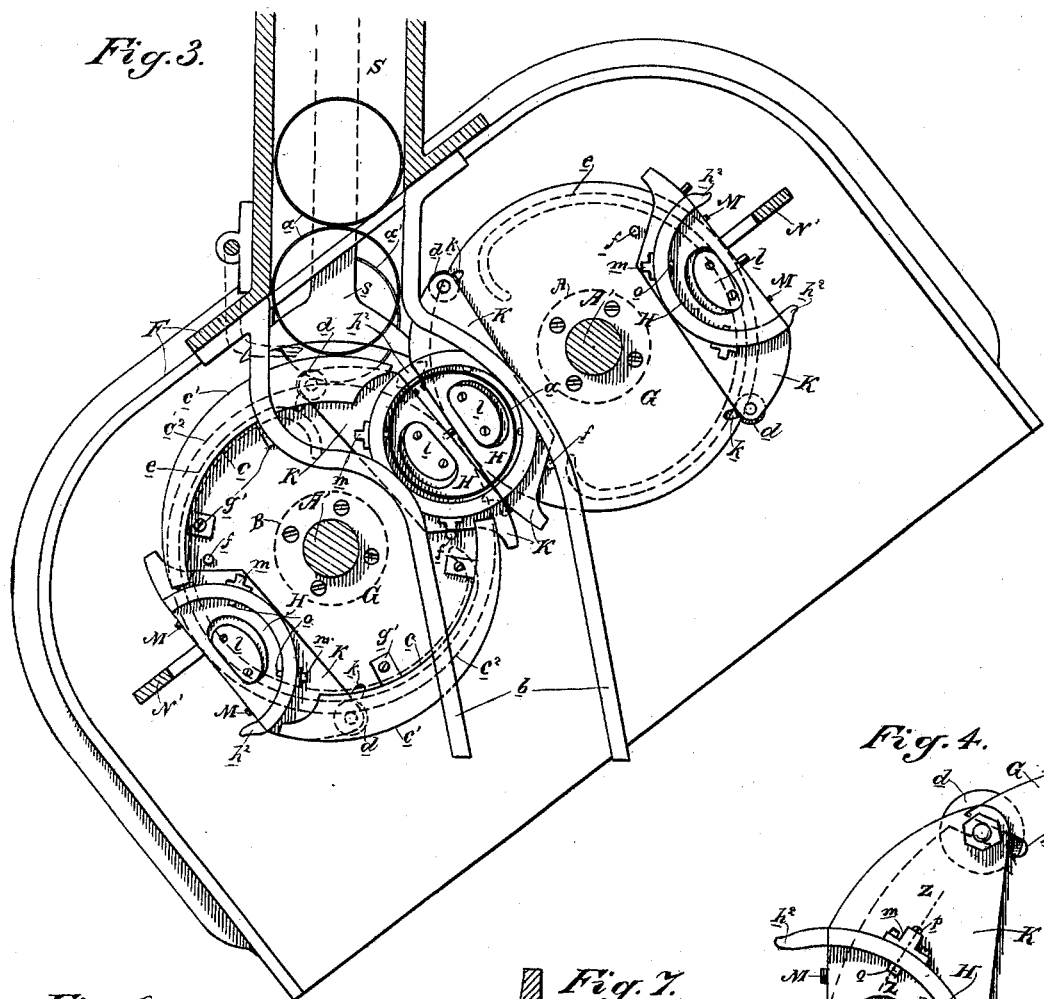
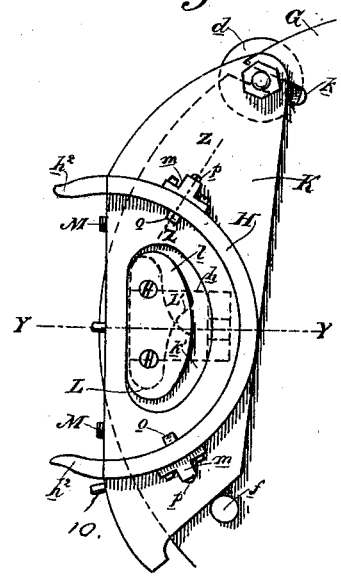
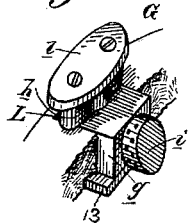
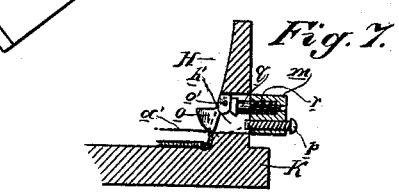
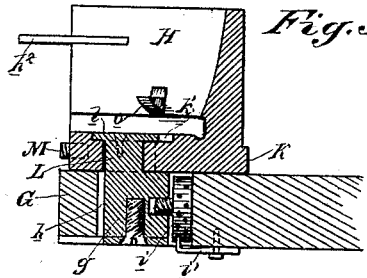
Witnesses,
Inventor,
Milton A. Wheaton
By Dewey & Co.
attys No. 619,106. Patented Feb. 7, 1899.
M. A. WHEATON.
CAN HEADING MACHINE.
(Application filed July 28, 1891.)
(No Model.) 6 Sheets—Sheet 4.

Witnesses, Inventor,
Milton A. Wheaton
By Dewey & Co., Attys.

No. 619,106.  
M. A. WHEATON.  
CAN HEADING MACHINE.  
(Application filed July 28, 1891.)  
Patented Feb. 7, 1899.

(No Model.)  
6 Sheets—Sheet 5.

Witnesses:  
Inventor,  
Milton A. Wheaton  
By Dewey & Co.  
Attys

No. 619,106. Patented Feb. 7, 1899.
M. A. WHEATON.
CAN HEADING MACHINE.
(Application filed July 28, 1891.)
(No Model.) 6 Sheets—Sheet 6.

Witnesses,

Inventor,
Milton A. Wheaton
By Dewey & Co.
Attys

UNITED STATES PATENT OFFICE.

MILTON A. WHEATON, OF SAN FRANCISCO, CALIFORNIA.

CAN-HEADING MACHINE.

SPECIFICATION forming part of Letters Patent No. 619,106, dated February 7, 1899.

Application filed July 28, 1891. Serial No. 400,990. (No model.)

*To all whom it may concern:*

Be it known that I, MILTON A. WHEATON, a citizen of the United States, residing in the city and county of San Francisco, State of California, have invented an Improvement in Can-Heading Machines; and I hereby declare the following to be a full, clear, and exact description of the same.

My invention relates to a machine for putting the heads upon cans.

It consists in certain details of construction which will be more fully explained by reference to the accompanying drawings.

The principal features of my invention are two pairs of half-circular jaws of peculiar construction for receiving the two can-heads and also for receiving and guiding the two ends of the can-body into the can-heads as they are forced upon the ends of the can-body.

On account of the construction and mode of operation of my two pairs of half-circular jaws I am able to build an entire can-heading machine without having in the machine any pistons or plungers or any molds or other devices for seizing or shaping the can-bodies except at their extreme ends and without any intermittent motion that stops the can-bodies while the heads are being forced upon them.

Although my invention includes an entire can-heading machine, I will first describe the general construction and mode of operation of my two pairs of half-circular jaws.

Figure 11:
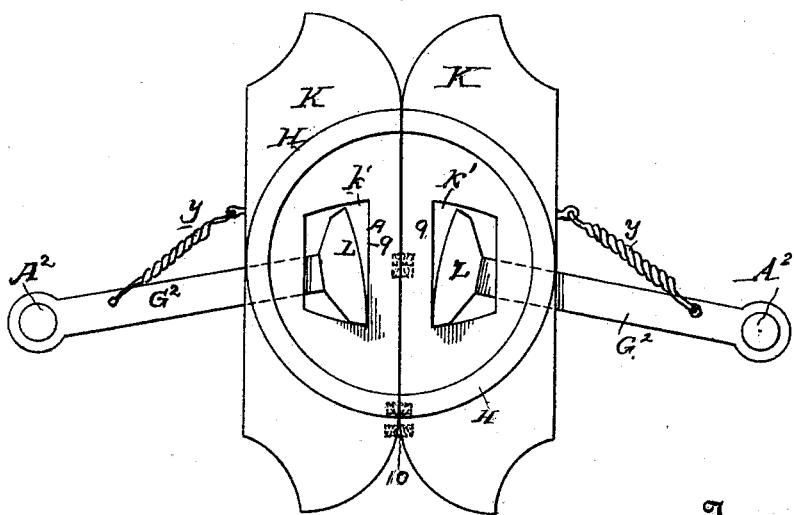

Figure 11 of the drawings is a diagram or plan view in a vertical position, showing the construction and operation of the said jaws. In this figure K K are two metal plates. To each of these plates is firmly fixed a semicircular half-ring H. The two half-rings H H project forward from the plates K from one to two inches, and their internal surface should be beveled, so as to make the inside of the ring somewhat funnel-shaped and contracted in diameter between its front edge and the annular shoulder hereinafter described. Neither the width of the ring nor the amount of the bevel of its inner face can be exactly defined as to extent or limit, as they may be varied without changing the operation of the machine. The beveling of the inner face of the ring may in fact be entirely dispensed with, but it is better to use it. Around the inner circumference, at the bottom of the ring, is made an annular recess, Fig. 5, which is just large enough in its diameter to surround the can-head and wide enough to receive loosely the rim of the can-head. The front side or edge of this annular recess forms an annular shoulder that runs entirely around the ring. When the can-head is inclosed in this recess in the ring, the front edge of the can-head rim will be located just behind this shoulder, and the funnel-shaped contraction of the ring, which results from its beveled inside face and of which the annular shoulder is the termination, will force the end of the can-body into a true circular shape and will contract and guide it directly into the rim of the can-head. Fig. 5 of the drawings is a cross-sectional view of one of these jaws and shows the recess for the can-head and the shape of the ring in cross-section.

In Fig. 11 large openings $k'$ $k'$ are made through the plates K K. The inside edges 9 9 of these openings are made perfectly straight and parallel with each other. $G^2$ $G^2$ are arms, each one of which has its outer end pivoted on one of the fixed pins $A^2$. On the inner ends of these arms are rigidly fixed the lugs L L, each one of which projects forward through one of the respective openings $k'$, so as to bear against the straight edge 9, which is the wall of the opening. The long sides of these lugs form the ends of the arms, and they are made in the form of an arc of a circle, of which the pivot $A^2$ is the center. These circular faces which form the ends of the arms bear against the parallel edges or walls 9 9 in the plates and will keep the plates in close contact or proximity to each other while they are moving up and down so long as any part of those circular faces remain in a direct line between the centers of the pivots $A^2$ $A^2$. When the jaws are moved either upward or downward so far that the circular faces of the lugs L L have passed either above or below a direct line between the centers of the pivots, the jaws will be drawn away from each other by the arms $G^2$ $G^2$, each one of which carries its jaw around in the segment of a circle, excepting so far as the circular faces of the lugs L L and the parallel walls 9 9 keep the jaws together for a short distance, as described. As the jaws are raised upward their upper ends first separate from each other, and when they descend so far that they separate from each other below they first separate at their lower ends. The farther they are carried around in either direction the farther the jaws will separate from each other. When the jaws are raised so far that their upper ends are separated a sufficient distance to permit it, a can-head and the end of a can-body are dropped down between them and are arrested and held by the lower parts of the jaw-rings, which remain closer together. Another pair of the jaws constructed and operating in the same way is placed facing those just described and just far enough in advance of them to receive and hold in the same way the other can-head and the other end of the can-body. The can-heads are dropped in a vertical line into the recesses mentioned, while the ends of the can-bodies will be received in the lower part of the half-rings a short distance in front of the recesses. The two respective pairs of jaws at the two ends of the can-body are separated from each other, when the can-heads and ends of the can-body fall into them far enough to allow the can-body to fall in a horizontal position lengthwise between the two can-heads and leave some little distance (half an inch or even less will do) between each can-head and the end of the can-body in front of it. This is for the purpose of allowing the end of the can-body to first be inclosed in the rings at points where the internal diameter of the ring is increased by the outward flaring of the internal faces of the rings, thereby better insuring the inclosing of the ends of the can-body when from any cause they are not of a true circular form, but drop into the jaws irregular in shape. As the jaws descend the two half-rings in each pair come together and inclose the can-heads and two ends of the can-bodies. By suitable mechanism the two pairs of jaws are drawn toward each other, in which operation the two ends of the can-body are forced into the circular shape of the inside of the rings and are sufficiently compressed to enter into the rims of the can-heads which are just behind the shoulders that form the terminations of the inward contractions of the rings and the front edges of the recesses in which the can-heads are inclosed. By means of the circular faces of the lugs L L and the parallel edges or walls 9 9 the two halves of each pair of jaws will be held together while the ends of the can-body are passing into the rims of the can-heads. After this the jaws will continue to descend until the lower ends of the jaws separate sufficiently to allow the headed can to drop out from between them, after which they will be again raised to their first elevated position ready to repeat the operation by heading another can.

The two halves of each set of jaws may sometimes require to be adjusted slightly in respect to their proximity to each other. If they are in immediate contact, the ring may be a trifle too small, and the end of the can-body that is forced through it in reaching the can-head will be crimped and the can-head will fit too loosely upon it, or if the two halves are too far apart the ends of the can-body will cross the rim of the can-head and the can will not be headed. To regulate this and keep the ring of the proper diameter, I tap screws M M into the edge of one of the plates K and let their outer ends project and receive the impact of the opposite plate. By turning these screws farther in or farther out of the plate the distance between the two plates and the diameter of the ring across the plates may be adjusted with exact precision. The slight opening between the two plates and also between the ends of the two half-rings will not perceptibly affect the operation of the jaws in heading cans. If the two walls 9 9 should not be perfectly parallel with each other, the variation may be corrected by the screws M M. As the jaws must come and remain together in exact relative positions with each other I insert in the edge of one of the plates K one or more pins 10 and have corresponding holes to receive their projecting tapering ends in the opposite plate K. As the plates come together the tapering pins of one plate enter the holes in the opposite plate and guide both of the plates to their proper relative position with each other and hold them in such positions until they separate.

Coil-springs $y$ $y$ may be used to draw the jaws back and keep the walls 9 9 in close contact with the circular faces of the lugs L L. In the operation of heading cans described the jaws have a rotating movement to a limited extent around the pivots $A^2$ $A^2$, and they also have a partial vibrating or rotating movement around the lugs L L. Both of these movements are necessary in all the forms in which I have embodied the use of the jaws in my machine. It is obvious that the circular faces on the sides of the lugs may be changed to a straight line and the convex curve made upon the walls 9 9 of the openings against which the lugs bear, or the arms G G may be made with curved lugs at their outer ends and have their inner ends connect with the jaw-plates by means of a simple strong round pivot. There are many methods of obtaining for the jaws the double movement mentioned; but I claim each and every one of them as the equivalent of the means herein described.

I have described one simple method of constructing and applying the jaws having the compound double movements explained. These jaws, operating as explained, I consider the foundation of my invention and improvements herein described, and I will now proceed to describe one of the best forms known to me of can-heading machines in which the said jaws are incorporated.

Figure 2:
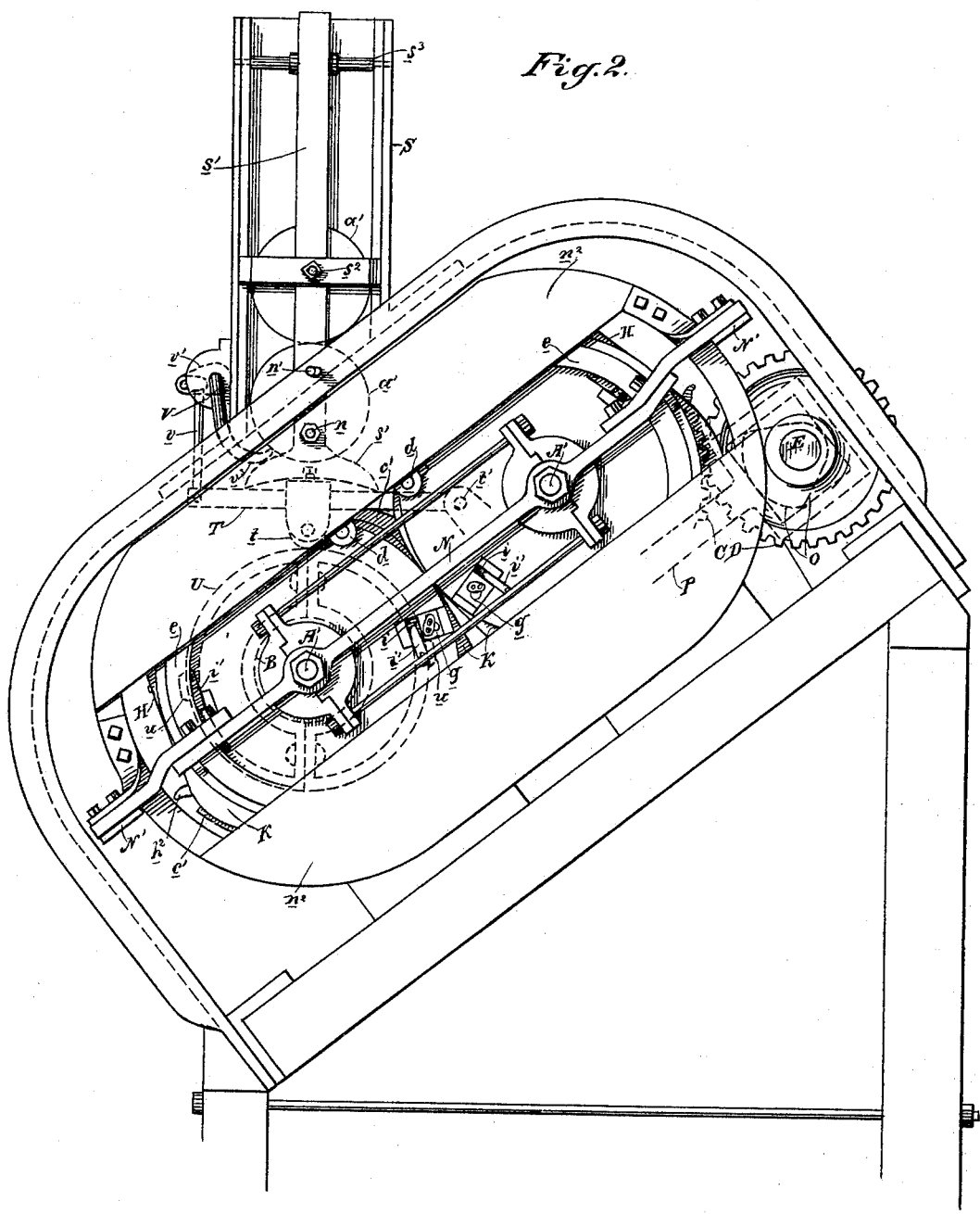

In the drawings, Fig. 1 is a side elevation. Fig. 2 is an end view. Fig. 3 is a vertical section taken through line X X of Fig. 1.

Figure 7:
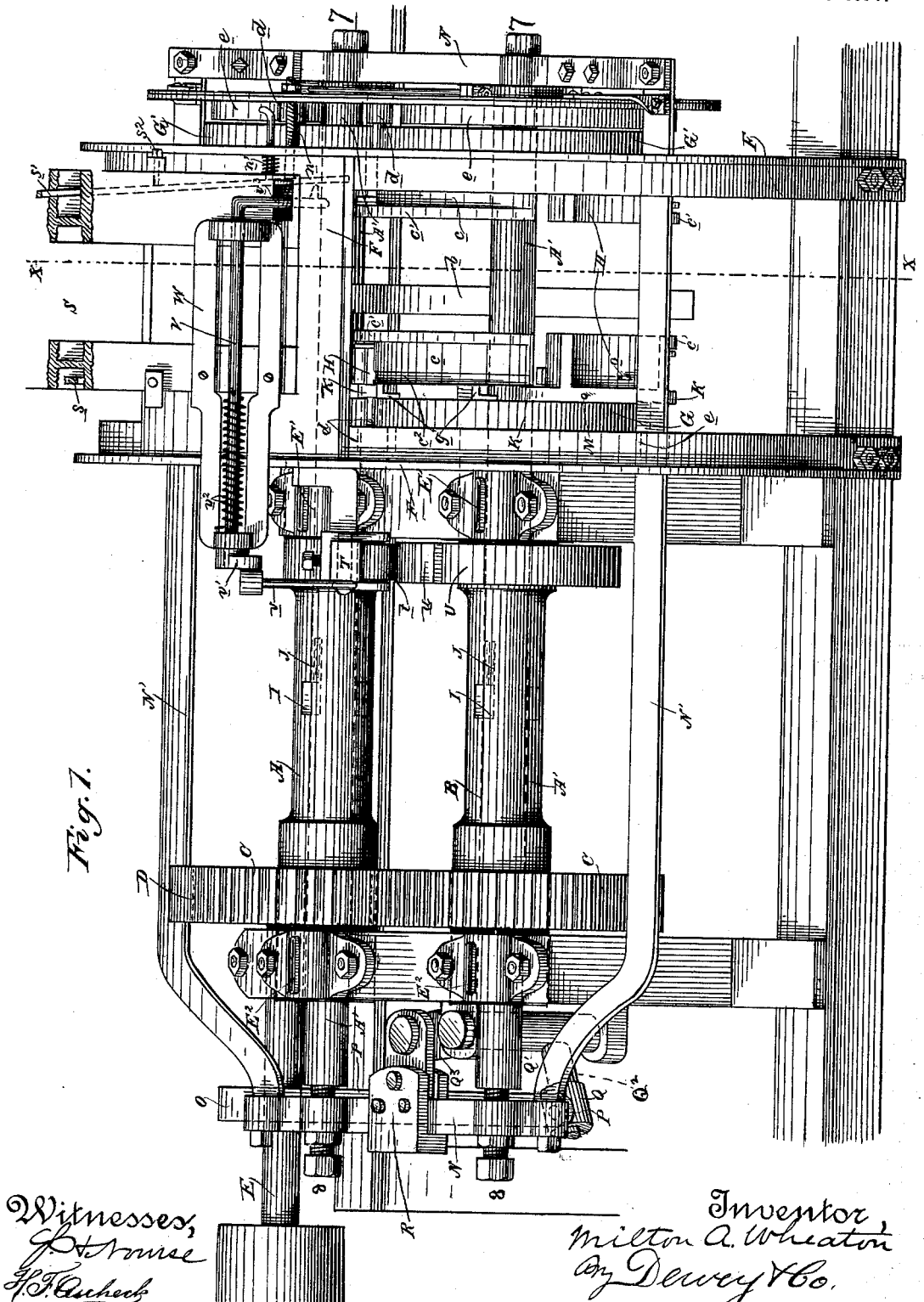
Figure 8:
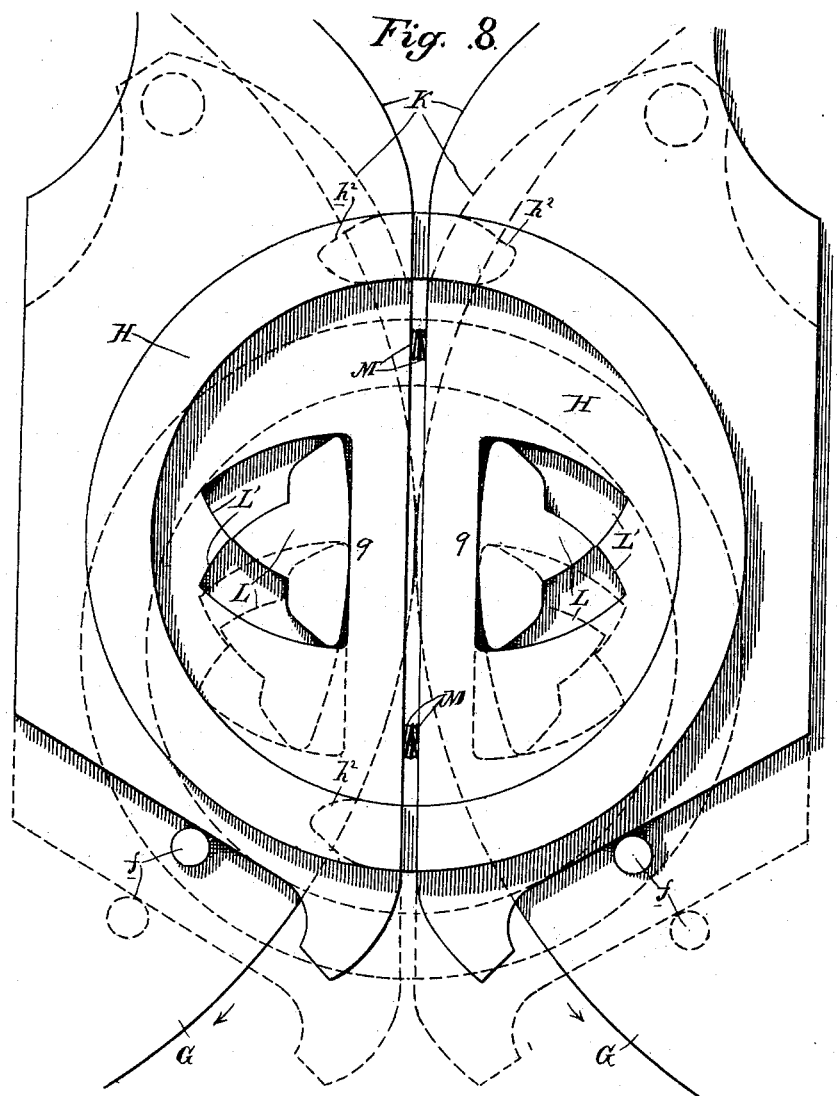
Figure 9:
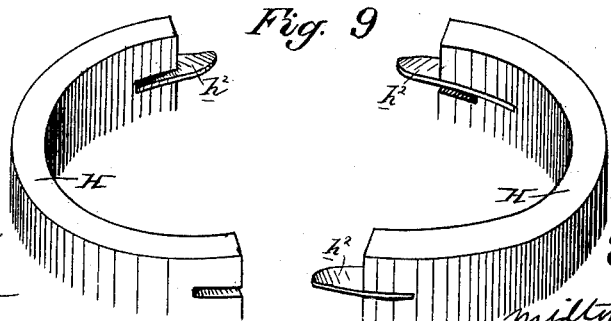
Figure 10:
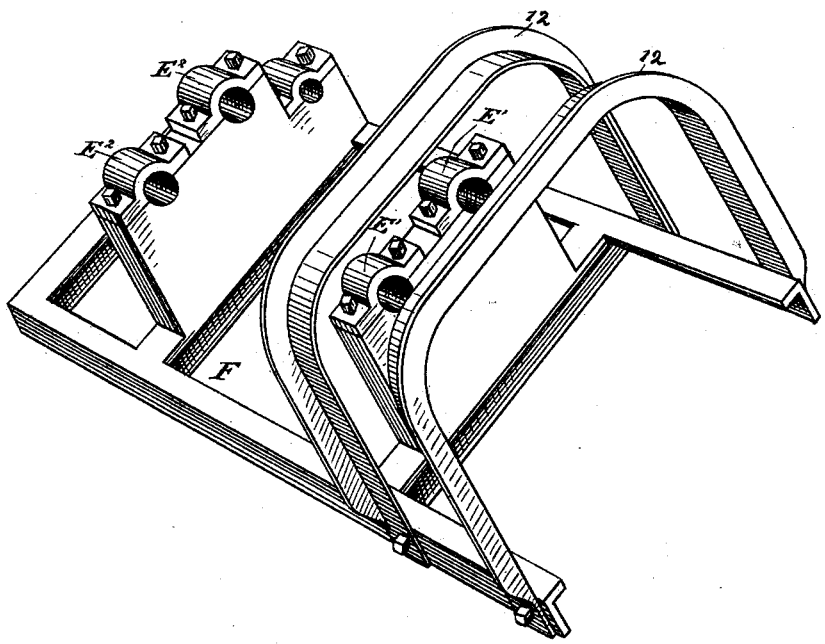
Figure 12:
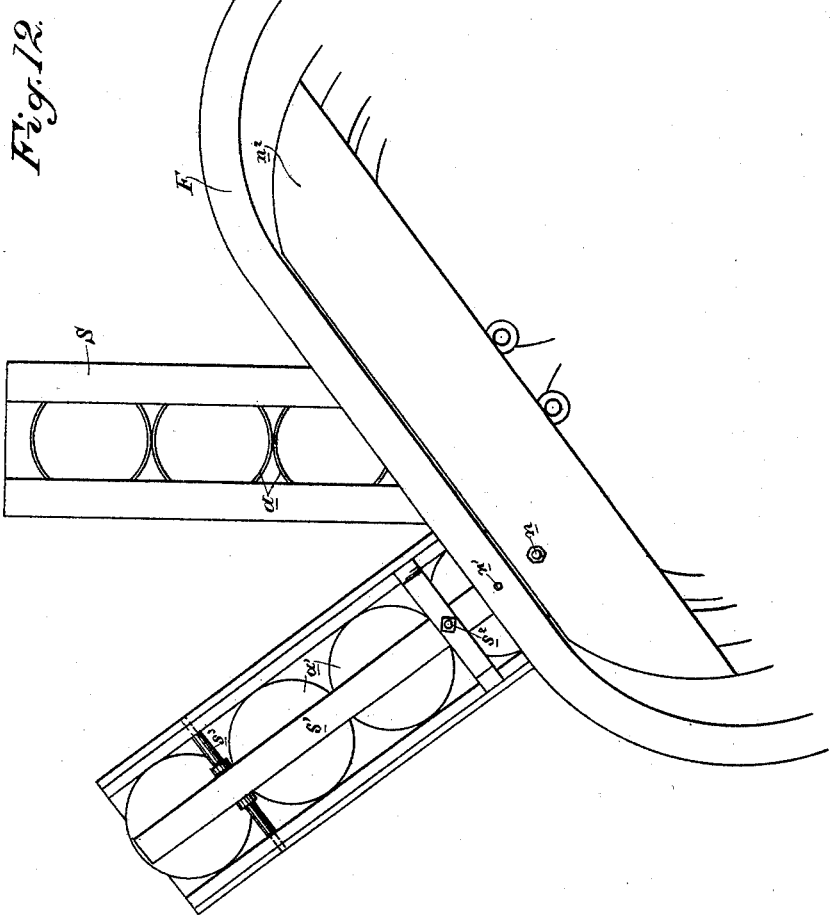

Fig. 4 is a detail view of one of the jaws or half-clamps. Fig. 5 is a cross-section of the jaw, taken on line Y Y of Fig. 4. Fig. 6 is a perspective detail view of the apparatus which holds the jaw in place and permits it to vibrate or swing with a partially rotative motion, so that the two half-rings in each pair of jaws may come together and form a complete ring around the can-head and end of the can-body while the head is being forced upon the end of the body. Fig. 7 is a cross-sectional view taken on line Z Z of Fig. 4. Fig. 8 is a diagram of the jaws, the dotted lines showing a second position of them. Fig. 9 is a perspective partial view of the half-rings of a jaw, showing fingers or prongs placed in them for the purpose of forcing into proper circular shape the ends of can-bodies that go into the machine deviating from a round form. Fig. 10 is a metal frame shown separate from the moving parts of the machine. Fig. 11 illustrates the principle with one pair of jaws. Fig. 12 shows a method of placing the feeding-chute for the front can-heads in a new position.

For convenience of description I will designate the right-hand end of the frame and machinery, as shown in Figs. 1 and 10, as the "front" end and the opposite end as the "back" end. I will also designate the bottom side of the same figures as the "front" side of the frame and machinery and the top side of the same figures as the "back" side of the frame and machinery.

In the drawings, Fig. 10 shows a metal frame, with boxes for the journals of shafts. As here shown, the two elevated bent bow-pieces 12 12 are made of angle-iron, while the remainder of the frame may be of cast-iron. This entire frame is shown by itself for the purpose of making the other figures, which include the same frame in whole or in part, more easily understood. Its particular form and the forms of its parts are otherwise unimportant. Two large hollow parallel shafts A and B are placed in the frame and are journaled in the boxes E' E' and E² E². Journaled upon these large shafts are the two gear-wheels C C. Both the gear-wheels C C are of the same diameter and mesh together, so that one will revolve just as many times and at the same rate of speed as the other. The driving-shaft E, having a driving-pulley attached to it, is journaled in the frame parallel with the large shafts A and B. On the inner end of the driving-shaft is a gear-wheel D, that meshes into one of the gear-wheels C and is just half their size, so that the driving-shaft revolves around just twice while the other shafts revolve around once. Two other shafts A' A' of less diameter, but of greater length, pass through the large hollow shafts and are supported and carried by them. Longitudinal slots J J are cut through the large hollow shafts, and corresponding slots, of less length, are cut through the shafts A' A'. Sliding keys I I are made tight in the shafts A' A' and, sliding lengthwise in the slots J J, permit the shafts A' A' to slide back and forth lengthwise in the hollow shafts and at the same time compel them to revolve around together. The two side pieces N' N' and the two end bars N N form a reciprocating frame that is carried by the shafts A' A', being connected with them by the screw-bolts 7 7 and 8 8. The screw-bolts 7 7 pass through the bar N and into the ends of the small shafts A' A' at the forward end of the machine, and the screw-bolts 8 8 pass through the other bar N and into the ends of the shafts A' A' at the back end of the machine, and as the reciprocating frame is driven back and forth the small shafts A' A' are forced to move with it.

The reciprocating frame is driven back and forth by the following mechanism: A cam O (shown in Figs. 1 and 2) is fixed onto the driving-shaft E. A bar P is connected with the cam O at one end and is bifurcated at its other end, so as to receive between the two branches of the bifurcation the collar Q. The branches of the bifurcation are pivoted to the upper and lower sides of the collar Q in the manner shown on the upper side of the collar in Fig. 1. A standard Q' is journaled to the main frame in a vertical position to it. An arm $Q^2$ projects from the standard, at a point toward its lower end, in a convenient position to be moved back and forth by the cam O and the connecting-bar P and the collar Q, which is journaled onto the arm $Q^2$. At a higher point, nearly or quite in the same plane with the end bar N of the reciprocating frame, another arm $Q^3$ projects from the standard, nearly or quite at right angles with the arm $Q^2$, and is connected with the end bar N by means of a link and the flat collar R, which is attached rigidly to the bar N. The standard Q', with its arms $Q^2$ and $Q^3$, serves as a bell-crank for transmitting the motion of the cam-bar P to the reciprocating frame and small shafts A' A', which reciprocate with the frame. The collar Q is put on a long journal of the arm $Q^2$. By moving this collar along the journal of the arm the length of the arm between the standard and the ears of the collar Q will be shortened or lengthened, according to which way the collar is moved, and thereby the longitudinal motion of the reciprocating frame and small shafts A' A' will be diminished or increased and regulated at will. A convenient method of fixing the collar Q upon the journal of the arm is to make the journal a screw and have a corresponding screw-thread on the inside of the collar, so that it may be moved to any desired position on the journal by means of such screw. As the collar may rotate on the journal vertically and the ears or pivots may rotate horizontally in the bifurcated ends of the bar P a universal joint is formed by the several parts acting together. The revolving of the cam O operates the several devices described and drives the reciprocating frame and the shafts A' A'.

The hollow shafts A B extend a short distance in front of their bearings E' E' and have journals on such extended ends. Two disks G G are rigidly fastened upon these journals, as shown in Fig. 3. These disks are of a little less diameter than the gear-wheels C C. These two disks are in the same line and plane with each other crosswise with the machine. The shafts being driven by the gear-wheels C C, which mesh into each other, cause the upper edges of the disks C C, which are journaled to the shafts, to revolve toward each other when the machine is doing its work, and the inner edges of the disks, which are adjacent to each other, both move downward.

Upon the smaller shafts A' A', which pass through and are carried by and revolve with the hollow shafts, are rigidly fixed two other disks G' G'. (Shown in Fig. 1.) The disks G' G' are of the same diameter as the disks G G and stand directly in front of them. Each one of the disks upon the small shafts A' A' has its center and center of motion exactly in line with the center and center of motion of the corresponding disk G, which is fixed back of it upon the hollow shaft. The four disks are uniform with each other in size. The two of them which are upon the same set of shafts A and A', in line with each other, revolve in one direction, while the two that are upon the other set of shafts B and A' revolve in the opposite direction. In all respects other than that each pair revolves in opposite directions all the disks revolve precisely alike. Each makes a revolution in the same time in which every other one makes a revolution and moves at the same corresponding rate of speed.

The forward disks G' G' reciprocate longitudinally, while the back disks G G do not. The forward disks therefore have a compound longitudinal and revolving movement while the back disks have a revolving movement only. The object and use of these disks are to carry and operate the jaws which have already been described for putting on the can-heads. For convenience and the accomplishment of more work I place more than one set of jaws upon the disks, so that more than one can will be headed at each revolution of the disks.

Upon the machine described in this specification there are placed two sets of jaws, so that two cans will be headed at each revolution of the disks. To the inner surface of each disk are fixed two of the jaws. The jaws are opposite to each other across the diameter of the disk. Both are attached to the disk in the same manner, but act entirely independent of each other, the two jaws on each disk being used for heading two different cans. The positions of the two jaws upon each one of the disks are plainly shown in Fig. 3. The jaws are located upon the disks, so that as the disks revolve one of the jaws upon one disk will be brought in contact with its companion jaw upon the adjoining disk, and the two will form an entire ring in substantially the same manner and for the same purpose as are the two jaws shown in Fig. 11, already explained. Two of the jaws used in my machine are shown near the center of Fig. 3 nearly in contact with each other. The distance between the front and back jaws and disks should be arranged so that when they are drawn nearest to each other a can with the heads forced upon it will just fill the space between the plates K K of the two front jaws and the corresponding plates K K of the two back jaws. To this distance must be added the distance which the reciprocating frame advances to reach the point where the disks are the farthest apart when the machine is at work. I have found by actually operating the machine that one inch and a half is a convenient distance for the reciprocating movement of the frame to cover. As the reciprocating frame and small shafts A' A' and the front disks and the jaws carried by the front disks are all connected together they all move the same distance together.

As shown in Figs. 1, 2, and 3, the main metal frame of the machine is inclined from its fore side to its back side at an angle of about thirty-eight degrees from a horizontal line. This incline places the two disks which are nearest the fore side of the machine at a lower elevation than are the other two disks nearest the back side of the machine. By thus inclining the machine the can-heads and ends of the can-bodies can be made to fall into and be received by the half-rings in the jaws on the lower disks before these jaws meet the corresponding jaws on the upper disk which act with them in inclosing the can-heads and ends of the can-bodies. This part of the construction and operation of the machine is as follows: Fig. 3 is a cross-section taken through line X X of Fig. 1. It includes the two back disks G G and the four jaws which they carry; also the chute for the can-heads, with one can-head a' shown therein; also a part of the chute for the can-bodies with sections of can-bodies a therein and other devices, which will be described hereinafter. The chutes, as here constructed, have a thin plate, which descends and forms a partition between the can-head chute and the chute for the can-bodies. The can-head chute has also two vertical side pieces a little farther apart than the diameter of the can-heads, which form the narrow sides of the can-head chute; also a vertical rod S, which serves as the fourth side of the can-head chute. I prefer the rod S for the outside of the can-head chute, for the reason that can-heads are sometimes bent or warped out of their proper shape, and the rod gives the edges of the can-head more play when bent than they would have with a fully-inclosed side. The rod S is made wide at its bottom, so as to better act as a guide at that point for directing the can-head into the recess made for it in the half-ring of the jaw. A bridge c, which is fastened to the disk by the bracket-lug $g'$, is placed so as to cover nearly the whole distance between the back end of one jaw and the forward end of the other jaw upon the same disk. There being two jaws upon each disk, there are two bridges to cover the long spaces between them. The bridges are wide enough to receive and carry both the can-heads and the ends of the can-bodies. As here shown, each bridge has a vertical flange $c'$ rising from its side that is farthest from the disk. The flanges are wider at their forward ends and diminish in width toward their back ends. The flanges receive and carry the can-bodies while the part of each disk that is between the jaws is rotating underneath the chutes. The other parts of the bridges carry the can-heads at the same time. In Fig. 3 a can-head $a'$ is shown resting on its part of the bridge and a can-body $a$ is shown resting on the flange of the bridge.

In order to more certainly guide the can-head into its annular recess in the half-ring of the jaw, I cut an annular groove $c^2$ in the upper face of each one of the bridges on the back disks G G, which groove is just wide enough to receive loosely the lower edge of the can-head and is located so as to pass directly under the lower end of the can-head chute. The groove runs in line with the recess in the jaw that receives the can-head and leads the can-head directly into it as the disk revolves.

The operation of the bridges shown in Fig. 3 when the machine is at work is as follows: The chutes are stationary, and as the can-heads and can-bodies pass down them the lower can-head and the lower can-body rest upon the bridge, as described. As the disk revolves, the bridge is carried around under the chutes until it passes them and the jaw following it comes under the chute. The lowest can-head and the end of the lowest can-body will then descend into the jaw and be carried forward, leaving the column of can-heads and can-bodies above free to descend. As they descend, the forward end of the bridge will have come under them and will receive and carry them until the next jaw comes under the columns, when the operation is repeated. The can-heads and end of the can-body which were received into the jaw will be carried forward until the jaw meets with its companion jaw on the other adjacent disk, when the two half-rings of the two jaws will close together and form one ring around the can-head and end of the can-body. The other end of the can-body and the other can-head will at the same time have been received in the half-rings of the jaws on the front disks and similarly inclosed by them. The disks will continue to revolve without stopping, and the cam O on the driving-shaft and the connecting devices will draw the reciprocating frame, with the forward disks and the jaws which they carry, back toward the back disks, and the can-heads will be forced upon the can-bodies. The forward rotation of the disks will still continue, and the jaws will separate from each other below, and the headed can will drop out from the jaws into any convenient receptacle. The further rotation of the disks will bring the jaws into position for again repeating the operation.

I have operated the machine and headed cans with it while it was in a horizontal position and the disks were all at one and the same elevation. To do so required extra machinery for delivering the can-heads and can-bodies into the jaws. The result was a greater cost and greater complication of machinery, slower work, and a less perfect operation of the machine. By placing the machine in the inclined position described, so that the two disks nearest the fore side of the machine are lower than the other two disks, I am able to place the chutes over the two lower disks and to fill the chutes with the heads and bodies of the cans and let them pass directly into the jaws, as described, without having to pass through intervening mechanism. I am also able to use the bridges described for receiving and sustaining the columns of the heads and bodies of the cans in the chutes while the jaws are not under the chutes, which would not be practicable if the disks were all on the same level and the chutes equally over both, as described in reference to Fig. 11.

Near the back end of each one of the plates K of the jaws is fixed a long stud, which reaches across the edge of the disks G. On the outer ends of these studs are journaled small friction-wheels $d$, which travel upon stationary guide-tracks $e$. The jaws are held to the disks by the following means: Lugs L, Figs. 4, 5, 6, and 8, extend through the large openings in the plates K. The lug L is an extension of the solid piece of metal $g$, that is fixed rigidly in the disk. (See Figs. 5 and 6.) A rectangular slot is made through the disk, and the solid part $g$ is placed therein. Shoulders of the lug L (shown in Fig. 6) rest upon the face of the disk on each side of the slot. A plate 13 is placed across the slot on the other face of the disk, and a heavy screw passing through the plate and tapped into the part $g$ holds the device in place. The pressure upon the lug L is always against its circular side. With its head bearing against the end of the rectangular slot toward the center of the disk is placed the screw $i$, which is tapped radially with the disk into the solid part $g$ of the lug. By turning this screw the lug and the jaw attached to it may be moved toward the edge of the disk or permitted to be moved in the opposite direction. This screw $i$ is used, in connection with the screws M M, for setting any two companion jaws closer together or farther apart, as may be necessary. The head of the screw $i$ is perforated and fastened with the small dog $i'$ to prevent its working loose and allowing the jaw to get out of place. The jaw is secured to the lug by a plate 1, which is fastened across the top of the lug and spreads out, so as to form a flange over a portion of the jaw-plate, underneath which a portion of the jaw-plate will swivel. The surface of the jaw-plate is cut away, as shown at $k'$, Fig. 4, so as to lower the plate 1 and allow its surface to be level with the surface of the jaw-plate. These last-mentioned devices are particularly shown in Figs. 4, 5, and 6. The side or wall 9 of each opening is made straight, and the side of the lug L which bears against it is formed in the arc of a circle which is concentric with the disk G, that carries it. When two companion jaws on adjacent disks come together, the two sides or walls 9 9 of the two jaws will be parallel, and the two circular sides of the two lugs L L of those two jaws will gear against the walls 9 9 and hold the jaws together as they are descending so long as any part of the circular sides of the lugs is in a direct line between the centers of the two disks, and their operation will be the same in all substantial respects as the action of similar parts which have already been described in connection with Fig. 11. If the lugs are made to fit the openings through the plates K K, as they move while the machine is at work both the openings and the lugs will be of the forms shown in Fig. 8 of the drawings, in which L L are the lugs extended through the openings of the jaw-plates K, and the form of the jaw-plate back of the lug is marked $L'$.

In Fig. 8, G G are the disks. H H are the half-rings of the jaws. K are the jaw-plates, and M M are the regulating-screws in the edge of one of the jaw-plates. The fingers or prongs $h^2$ shown in Fig. 9 are shown in dotted lines in Fig. 8.

Stop-pins $f$ are placed in the disks to limit the swiveling movement of the jaw-plates in one direction. Dotted lines in Fig. 8 represent the several parts carried to a lower position by the rotating disks and still held closely together by the circular lugs and parallel sides or walls 9 9 of the opening.

In Figs. 1, 3, and 4 there is shown a friction-roller $d$, which is on the outer end of a long stud that is rigidly attached to the back end of each one of the jaw-plates and reaches across the edge of the disk. Slots $k$ are cut in the edges of the disks to make room for the long stud when the jaw swivels, so as to carry the stud inside of the periphery of the disk. The eccentric guide-track $e$ is placed, as shown, so that the rollers will raise the back ends of the jaw-plates and swivel them around the lugs L, and thus turn the forward ends of the companion plates downward and cause them to approach each other in the right position to have the tapering guide-pins 10 of one plate enter the holes in the edge of the other plate, and thus direct the two jaws into their proper positions with each other, as before explained. Another guide-track should be placed on the opposite side of the roller $d$, so that the roller will be kept between the two guide-tracks and control the position of the jaw while it is receiving a can-head from the chute. The two long parallel bent pieces extending in a vertical direction (marked $b$ in Figs. 1 and 3) are mainly for the purpose of compelling the headed cans to leave the jaws when it is time for them to do so. Sometimes the headed cans will stay in the half-jaws, and when they do so the can will be carried by the rotating disk against one or the other of the bars $b$ and forced out of the jaws. The bars $b$ are bent, as shown, so as not to interfere with the can-bodies as they are carried downward in the jaws.

The front chute for the can-heads must deliver the can-head into the jaw that travels endwise with the machine, and for this reason it must have a somewhat different arrangement from the one that has been described for the back can-head chute. Figs. 2 and 12 show two different arrangements for this front can-head chute. In Fig. 2 two metal plates $n^2$ $n^2$ are shown. To the inside of these plates are attached eccentric guide-tracks for the friction-rollers $d$ at the back ends of the jaw-plates to travel on and also other circular tracks or bars on the outside of the rollers, the same as those already described in connection with the corresponding rollers $d$, attached to the jaw-plates on the back disks and which are more perfectly shown in Fig. 3. The plates $n^2$ $n^2$, with the guide-tracks and bars mentioned, constitute a frame which is placed in a vertical position edgewise and is attached to the reciprocating frame at the points marked $N'$ $N'$ in Fig. 2 and travels with it. In Fig. 2, B B are journal-boxes mounted in the shafts $A'$ $A'$. The extended ends of these boxes are connected together by the rods shown, and the boxes and rods comprise a collar for steadying the shafts and preventing them from springing apart from the pressure resulting from the coming together of the two jaws on the adjacent disks. In Fig. 2 upright bars S S furnish the sides for the chute of the can-bodies. They extend frontwise with the machine far enough to furnish supports, from and between which is suspended the front can-head chute. This front can-head chute is inclosed with a thin metal sheet for its back, two vertical side pieces at its edges, and a vertical metal strip $s'$ on its front side similar to the back head-chute. A screw-nut $s^2$ connects the strip $s'$ with a bracket, whose ends are fastened to the side pieces of the chute, and by means of this screw-nut the strip $s'$ may be moved forward and back and the thickness of the space for the can-head regulated at pleasure.

The front head-chute is suspended from the rigid uprights by the rod $s^3$, which passes through the uprights and also through the sides of the chute and the front bars. In driving the heads upon a can-body the front jaws are necessarily carried by the reciprocating frame a distance back of the vertical line of the head-chute, which can only swing back until it comes in contact with the front part of the can-body chute. The bridges also are carried back by the disk beyond the same vertical line, and the column of can-heads in the chute cannot rest and slide upon the bridges the whole distance between the two jaws on the rotating disk. For this reason I have adopted devices for holding up the column of can-heads in the front can-head chute and for dropping the lower can-head at the moment when the recess in the jaw is in a vertical line below the chute. In order to increase this moment of time somewhat, I cause the lower end of the swinging chute to travel a short distance with the reciprocating frame and keep the lower end of the swinging chute over the recess of the jaw. A bolt $n$ passes through the plate $n^2$ and has a nut on its outer end, which is outside of the plate $n^2$. The bolt passes loosely through the plate and has its back end fastened to the rod $s'$. When the jaw passes back beyond the vertical line of the chute, the bolt $n$ will slide loosely in the hole through the plate and will so continue to slide until the advance movement of the reciprocating frame brings the recess of the jaw in line under the head-chute, at which point the plate will come in contact with the nut $n$ on the bolt and draw the lower end of the chute with it, thereby keeping the chute and jaw in proper position for the can-head to pass from the chute into the jaw until the jaw has finished its advance movement and returned back as far as the head-chute can swing. A pin $n'$ passes through the rigid frame and has its back end fast in the vertical piece $s'$. A coil-spring is around the pin and serves to push the swinging chute backward after it has been drawn forward by the bolt $n$. By thus keeping the lower end of the chute in line with the jaw a sufficient length of time is secured for the head to pass from the chute into the jaw without being caught and crushed in its passage by the moving parts.

In Fig. 1 a rock-shaft V is shown, which passes through the ears at the ends of a plate W, that is fastened to the fore side of the can-body chute. The long arm $v^3$ of the rock-shaft at its front end is bent as shown at Figs. 1 and 2 and made wide at its extreme end, so that it will reach the rim of the lower can-head in the chute and prevent it and the column of can-heads that rest upon it from passing down. (See Fig. 2.) A coil-spring $v^2$ (shown in Fig. 1) is fixed to the rock-shaft and fastened at one end to any convenient place in the adjoining stationary parts. The power of the coil-spring will hold the rock-shaft in position, as shown in Fig. 2, until it is time to drop the lower can-head into the jaw. A pulley-shaped wheel U, made in halves, is mounted on the large shaft B. Two cam-shaped projections $u$ $u$ are fixed across the face of the periphery of the wheel U, each one being half-way around the wheel from the other. A small friction-wheel $t$ rests and rotates upon the periphery of the wheel U. As the wheel U is revolved with the shaft B the friction-wheel $t$ is lifted by the cam elevations $u$ as they pass under it. The friction-wheel $t$ is connected by a stirrup or any other suitable device to the lever T, which has its back end pivoted at $t'$ and its front end pivoted to the lower end of a link $v$. The upper end of the link $v$ screws into a large nut, so that its length may be increased or diminished at pleasure. A crank-pin passes horizontally through the back part of the large nut into the forward end of the short arm $v'$ of the rock-shaft. When one of the elevations $u$ on the face of the wheel U passes under and raises the friction-wheel $t$, the forward end of the short arm $v'$ of the rock-shaft is lifted, and the rock-shaft is rotated far enough to withdraw the long arm $v^3$ from the can-head and allow it to fall into the jaw, which at that moment will be under the can-head chute. The remainder of the column of can-heads in the chute follow the discharged one down and rest upon it until the elevation $u$ passes from under the friction-wheel $t$, when the rock-shaft is thrown back by the coil-spring $v$, and the long arm $v^3$ returns to its first position and comes in contact with the next can-head in the chute, holding it in place until the next jaw is ready to receive it. The parts are adjusted so that each can-head is released and passes down into the jaw at the same time that the other can-head and the can-body pass down into the jaws.

Fig. 12 shows the front swinging can-head chute placed farther toward the fore side of the machine than the can-body chute is placed. By placing the swinging chute in this position it is free to swing as far back as the bridges go. This arrangement allows the front traveling bridges to be used with the front swinging can-head chute in substantially the same manner as the back bridges are used with the back stationary chute. The method shown in Fig. 12 is the best when the jaws on the same disk are so far from each other that the front jaws can advance far enough to receive the can-head and still rotate forward without having the can-head in the jaw strike the end of the can-body that will be on the bridge waiting for the jaw to come under it. It is possible to use more than two sets of jaws on each disk, and the first method described requires less space between the jaws in the line of the rotation of the disk than does the latter method.

To insure the passing of the can-head directly into the recess in the jaw provided to receive it, I use a device which I call a "dog" and which is marked $o$ in Figs. 1, 3, 4, 5, and 7. A small frame is made for conveniently holding the dog and securing it in its proper place in the jaw-ring. The dog is pivoted in its frame, as shown in Fig. 7, and its peripheral face is made on a true circle with the pivot for a center. The peripheral face of the dog is flush with or a trifle inside of the annular shoulder that is in front of the can-head rim, so that as the dog rotates on its pivot its peripheral face will always be in the same relative position to the shoulder. When there is no can-body to interfere with it, the point of the dog will project some distance above the shoulder toward the center of the ring, as shown in Fig. 7, and a can-head passing down into the jaw will be guided and directed into its recess by the peripheral face of the dog whenever from any cause the can-head would, except for the dog, be thrown forward so that the front edge of the can-head rim would fall upon the annular shoulder instead of falling behind it. A set-screw $p$ stops the dog from going any farther when its highest point has receded far enough to be flush with the shoulder in front of the can-head. A spring-pin $q$, operated by the coil-spring $r$, throws the dog back to its place, as shown in Fig. 7, when the headed can is discharged from the jaws. As the can-head and end of the can-body approach each other the end of the can-body comes in contact with the part of the dog that projects inside of the ring and rotates it back out of the way. The frame that carries the dog is fixed in an opening cut through the half-ring, as shown in Fig. 7.

While I have described the devices which carry the jaws as disks, it is obvious that such devices need not be disks. They may be of any form that furnishes the necessary surfaces on which to attach the jaws, and although circular disks is a very convenient form in which to construct them many other forms will do as well.

Having thus described my invention, what I claim as new, and desire to secure by Letters Patent, is—

1. A can-heading machine having swiveling jaws operating in pairs and each pair comprising two half-circular clamps, separable at their upper ends to receive a can-head and end of the can-body, means for causing one of the pairs of jaws to approach the other and force the heads upon the can-body, and means for causing a separation of the lower ends of the jaws to enable the headed cans to pass out, substantially as herein described.

2. In a can-heading machine, the jaws operating in pairs and connected with means for causing one of the pairs of jaws to approach the other and force the heads upon the can-body, said jaws each comprising a jaw or half-ring constructed so as to swivel around the center of its own while it is carried by a disk or other radial device, which rotates on a more distant center, so that two of the jaws or half-rings which are carried upon adjacent disks or other radial devices will come together and form a complete ring, substantially as herein described.

3. In a can-heading machine, the swiveling jaws herein described, in combination with means for causing the separation of their upper and lower ends, whereby the cans are received and discharged, and the four disks or their equivalents for carrying these jaws, substantially as herein described.

4. In a can-heading machine, the jaws thereof adapted to swivel and having openings, in combination with lugs operating in said openings, means for operating the jaws, and a curved bearing-surface between the lugs and walls of the opening, substantially as and for the purpose described.

5. A can-heading machine comprising two pairs of companion swiveling jaws, one of said pairs of jaws being adapted to approach the other, disks or other radial devices carrying said jaws, a mechanism for holding the jaws adjacent to each other while they are moving forward holding the can-head and end of the can-body inclosed, and forcing the heads upon said body, substantially as herein described.

6. In a can-heading machine, the combination of disks or other radial devices working in pairs and each carrying one or more jaws or semicircular rings, one of said pairs of jaws adapted to approach the other, substantially as herein described.

7. In a can-heading machine, constructed with half-ring swiveling jaws operating substantially as herein described, the combination of oppositely-rotatable disks and mechanism for attaching the jaws to the disks so as to hold the jaws in place, and permit them to swivel, all constructed and operating substantially as herein set forth and described.

8. In a can-heading machine constructed with half-ring jaws which operate to come together and form rings substantially as herein described, the regulating-screws or equivalent devices by means of which the two half-rings of two companion jaws may be expanded, substantially as and for the purpose herein set forth.

9. In a can-heading machine constructed with two half-ring jaws operating substantially as herein described, the regulating-screws placed in the edge of one of the jaw-plates, substantially as and for the purpose herein set forth.

10. In a can-heading machine containing jaws with semicircular rings, depressible dogs pivotally placed in the rings for guiding the can-heads into the recesses in the rings prepared for them, substantially as herein set forth.

11. In a can-heading machine constructed with half-ring jaws substantially as herein described, the extended fingers or prongs placed in the ends of the half-rings so as to reach farther out and encircle the can-bodies and draw them within the half-rings in the manner herein set forth.

12. In a can-heading machine operating substantially as herein described and having complementary mechanism for receiving, heading and discharging the cans, the combination of the two large hollow shafts with the two smaller shafts passing through them, and the four disks or their equivalents, substantially as and for the purpose herein described.

13. In a can-heading machine, the swiveling jaws, disks or radial devices carrying the same, the large hollow shafts journaled in the main frame, the smaller shafts A' A' passing through the larger shafts, and a reciprocating frame carried movable with the smaller shafts, and means for actuating the frame, substantially as herein described.

14. In a can-heading machine, the combination of the reciprocating shafts that carry the can-heading jaws and the reciprocating frame in which the shafts are mounted, with the screw-bolts for connecting the shafts and frame together and regulating the distance at which the two sets of jaws may approach one toward the other, while putting the heads upon the can-body, substantially as herein described.

15. In a can-heading machine, a bridge arranged to travel under the chute for the heads and sustain the lower can-head in the chute until the jaw next in line of travel passes under the chute and receives the can-head, substantially as herein described.

16. In a can-heading machine having complementary mechanism for receiving, heading and discharging the cans, a bridge adapted to travel under the chute for the heads having a guiding-groove cut in its upper surface, substantially as and for the purpose described.

17. In a can-heading machine, the operating-jaws and the can-chute, in combination with a rock-shaft having an arm extending into the can-chute for arresting and sustaining the lower can-head in the chute, a pivotally-secured lever connected with the rock-shaft and means for operating said lever, to rock the shaft and enable the can-head to drop into the passing jaw, substantially as herein described.

18. In a can-heading machine, the half-circular jaws operating in pairs, one of said pairs adapted to approach the other, said jaws having plates K provided with extensions, friction-wheels mounted in the extensions, the tracks $e$ upon which the wheels travel and means for operating the jaws, substantially as herein described.

19. A machine for placing heads upon can-bodies consisting of segmental clamps, a mechanism by which they are opened to receive, and closed to hold the heads, and the ends of the can-bodies, and mechanism by which the clamps of one pair are caused to approach the other so as to force the heads upon ends of the can-body, and by which the clamps are opened and the completed can discharged, substantially as herein described.

20. A can-heading device, consisting of semicylindrical clamps having an interior diameter sufficient to receive the heads and ends of the can-body, a mechanism whereby these clamps are separated sufficiently to admit the heads and ends of the bodies to the interior and the clamps afterward closed together so as to surround and inclose the heads and the ends of the can-body, a mechanism whereby the opposing clamps are caused one to approach the other so as to force the heads upon the ends of the can-body after which the clamps are again opened to discharge the completed can, substantially as herein described.

21. A device for placing heads upon cans consisting of two semicircular segments mounted upon independent carriers, a mechanism by which said segments are moved simultaneously so that their upper edges are separated to receive the heads and the ends of the can-body, the carriers are moved and the segments closed together so as to form a complete circular clamp and the carriers are caused to separate and open the lower edges of the segments to allow the complete can to be discharged, a feed device by which said heads and can-body are delivered simultaneously into the segments when opened, and a mechanism for forcing the opposing heads upon the ends of the can-body while said segments are closed together, substantially as herein described.

22. In a device for placing heads upon can-bodies, the circular carrier-disks mounted upon shafts and rotating with their edges approximately in contact, plates supported upon said disks and carrying cylindrical segments, the edges of which are adapted to meet and form a complete circular clamp and to again separate by the continuous rotation of the disks, substantially as herein described.

23. In a device for placing heads upon can-bodies the rotating disk-carriers, the plates having semicylindrical segments fixed to them and caused to meet by the rotation of the disks so as to form a circular clamp, and a supporting lug or spur upon which each of the segment-carrying plates is mounted so as to have a rocking motion upon said spur, substantially as herein described.

24. In a can-heading machine, the hollow horizontally-journaled shafts, mechanism by which said shafts are rotated, disks fixed upon the adjacent ends of the shafts with their peripheries approximately in contact, semicylindrical segments mounted upon the peripheries of the disks, and adapted to close so as to form complete rings when brought together by the rotation of the disks, shafts extending through the hollow rotary shafts and so connected therewith as to receive a corresponding motion, disks fixed to the outer ends of these shafts with segments mounted upon them corresponding with those upon the disks of the main shafts, feeding devices by which the can-heads are delivered into each of these segments before they are closed together, while the can is delivered between a reciprocating framework supported upon the outer ends of the inner shafts, and a cam mechanism whereby this framework and the shafts are reciprocated so that the segments carrying the can-heads are caused to approach and force the heads upon the ends of the can which is delivered between them, substantially as herein described.

25. The horizontal parallel hollow shafts journaled to rotate in a fixed frame and having disks fixed to the corresponding ends of the shafts, independent shafts extending through the hollow shafts with carrying-disks upon their outer ends, a frame supported on the outer ends of these shafts, and a cam mechanism by which said frame, shafts, and disks are caused to reciprocate so as to approach and recede from the disks upon the main shafts, a mechanism whereby both the interior and exterior shafts are rotated simultaneously, semicircular segments mounted upon carriers which are loosely attached to the faces of the disks, so that as the disks revolve each pair of segments is successively caused to approach and clamp a can-head which is delivered between the segments by a feeding mechanism, devices to receive and support the can-heads until the segments have closed upon them, and a means for releasing and discharging the cans when the can-heads have been clamped thereon, substantially as herein described.

26. The rotary disks having their peripheries approximately in contact, lugs projecting from said disks, and carriers K having openings which fit loosely over said projections so as to allow the carriers to rock about them, segments mounted upon said carriers in such a manner that when the carriers are brought together by the rotation of the disks, the segments unite and form a complete clamp adapted to contain a can-head, and to direct the open end of the can so that when approached the can-head will be forced thereon, rollers $d$ journaled upon the upper edges of the plates K, slots $k$ made in the periphery of the disk through which the journal-pins of the rollers pass and cams $e$ over which said rollers pass after the disks have rotated so as to separate the carriers, whereby the latter are turned about the supporting-lugs, and set in position to receive can-heads when they again approach each other, substantially as herein described.

27. The parallel disks mounted upon shafts rotated toward each other from above, carriers loosely attached to the face of said disks so as to rock about their supporting-lugs, the ends of said carriers being curved, and the central portion forming a straight face which unites these curves, segments fixed to each of the carriers with such relation to those upon the opposite disk that they will close and form a complete ring when the carriers meet by reason of the rotation of the disks, and adjusting-screws M upon the carriers whereby the segments are caused to meet accurately, and adjusted with relation to each other, substantially as herein described.

28. The parallel disks mounted upon horizontal shafts and rotating toward each other from above, segments mounted upon carriers which are fixed to the faces of the disks so that they meet and cause the segments to join and form a complete ring when brought together, said carriers having that portion of the edges which is equal to the diameter of the segments made straight, so that the edges of the two carriers meet upon these lines, lugs projecting from the faces of the disks and fitting into cam-shaped openings in the carriers whereby the carriers are allowed to rock upon said lugs so as to maintain their meeting edges and the segments in contact during a portion of the revolution of the disks, substantially as herein described.

29. In a can-heading machine, the disks rotating in a fixed plane and carrying segments which are united by the rotation of the disks to form clamps for the heads for one end of the can, corresponding disks and segmental clamps to receive the heads for the opposite end of the can, and a mechanism whereby the latter disks are caused to approach the first-named ones after a can has been delivered between the two, a stationary chute by which the can-heads are guided and delivered between the clamping-segments of the inner end, and a movable chute pivoted at its upper end so that the lower end may move with the movement of the disks and clamping-segments of the outer end to which it delivers the heads, substantially as herein described.

30. The swinging guide or chute for can-heads with its alternately-reciprocating stops and actuating mechanism whereby can-heads are delivered successively from the lower end of the chute, segments mounted upon rotating disks beneath said chute and adapted to receive the can-heads therefrom and afterward to be closed by the rotation of the disks so as to form a continuous ring within which the can-head is clamped and a means whereby the chute or guide is maintained in line with the clamping-segments as the latter are reciprocated in line with their shafts, substantially as herein described.

31. In a can-heading machine, the combination, with oppositely-rotating mechanisms, of the two pairs of half-circular jaws, secured thereto and rotating therewith, each of said half-circular jaws adapted to move about its axial line during rotation of the heading mechanisms for the purpose of perfect registering with each other and holding of heads and bodies during the operation of heading, substantially as and for the purpose set forth.

32. In a can-heading machine, the combination, of pairs of oppositely-rotating mechanisms including jaws for holding the cans, and mechanism for moving said jaws about their axial lines during rotation of the heading mechanisms for the purpose of registering with each other.

In witness whereof I have hereunto set my hand.

MILTON A. WHEATON.

Witnesses:
S. H. NOURSE,
H. F. ASCHECK.